(12) United States Patent
Melesky

(10) Patent No.: US 7,650,722 B1
(45) Date of Patent: Jan. 26, 2010

(54) INSULATION COVER FOR ATTIC CLOSURES

(76) Inventor: James B. Melesky, 1345 Shadow Oak Dr., Malvern, PA (US) 19355

( * ) Notice: Subject to any disclaimer, the term of this patent is extended or adjusted under 35 U.S.C. 154(b) by 658 days.

(21) Appl. No.: 10/024,478

(22) Filed: Dec. 21, 2001

(51) Int. Cl.
*E04H 9/16* (2006.01)

(52) U.S. Cl. .............................. 52/199; 52/198; 52/19; 52/169.6; 182/46

(58) Field of Classification Search ............... 52/169.6, 52/745.06, 716.2, 198, 199, 202, 19, 200, 52/20, 205, 186, 39; 182/46, 47, 77
See application file for complete search history.

(56) References Cited

U.S. PATENT DOCUMENTS

| | | | |
|---|---|---|---|
| 541,987 A * | 7/1895 | Whiteside | 52/20 |
| 794,661 A * | 7/1905 | Clark | 137/371 |
| 3,356,183 A * | 12/1967 | Shell | 312/272.5 |
| 3,807,194 A * | 4/1974 | Bond | 62/457.4 |
| 4,065,336 A * | 12/1977 | Conklin | 156/69 |
| 4,151,894 A | 5/1979 | Edwards | |
| 4,187,647 A * | 2/1980 | Hall | 52/20 |
| 4,197,031 A * | 4/1980 | Hild | 404/26 |
| 4,203,686 A * | 5/1980 | Bowman | 404/25 |
| 4,281,743 A | 8/1981 | Fuller | |
| 4,299,059 A | 11/1981 | Smith | |
| 4,312,423 A | 1/1982 | Helbig | |
| 4,344,505 A | 8/1982 | Waters et al. | |
| 4,370,934 A * | 2/1983 | Haussler | 109/1 S |
| 4,541,508 A | 9/1985 | Lundh | |
| 4,591,022 A | 5/1986 | Sciambi et al. | |
| 4,832,153 A | 5/1989 | Daw et al. | |
| 4,925,509 A * | 5/1990 | Tippmann | 156/92 |
| 4,928,441 A | 5/1990 | Daley | |
| 5,271,198 A | 12/1993 | Freeman | |
| 5,475,955 A | 12/1995 | Dickinson | |
| 5,549,411 A * | 8/1996 | Hawkins | 404/25 |
| 5,628,151 A | 5/1997 | Monat | |
| 5,791,098 A * | 8/1998 | Thomas | 52/169.6 |
| 5,979,128 A * | 11/1999 | Parsons | 52/169.6 |
| 6,468,585 B2 * | 10/2002 | Tippmann et al. | 427/203 |
| 6,578,327 B1 * | 6/2003 | Hackbarth et al. | 52/202 |
| 6,651,391 B2 * | 11/2003 | Nale | 52/20 |
| 6,682,258 B2 * | 1/2004 | McNeely | 404/26 |
| 6,701,676 B1 * | 3/2004 | Kompelien | 52/19 |

* cited by examiner

*Primary Examiner*—Phi Dieu Tran A
(74) *Attorney, Agent, or Firm*—Lewis, Rice & Fingersh, L.C.

(57) ABSTRACT

Covers for attic trap doors and pull down attic stairs or ladders are described each of which is formed of an insulating material. The covers are structured to effectively seal a ceiling access opening. In some embodiments, a closure member constructed of insulating material is cooperatively and frictionally received within a frame formed of the same material to form an airtight seal therebetween.

11 Claims, 6 Drawing Sheets

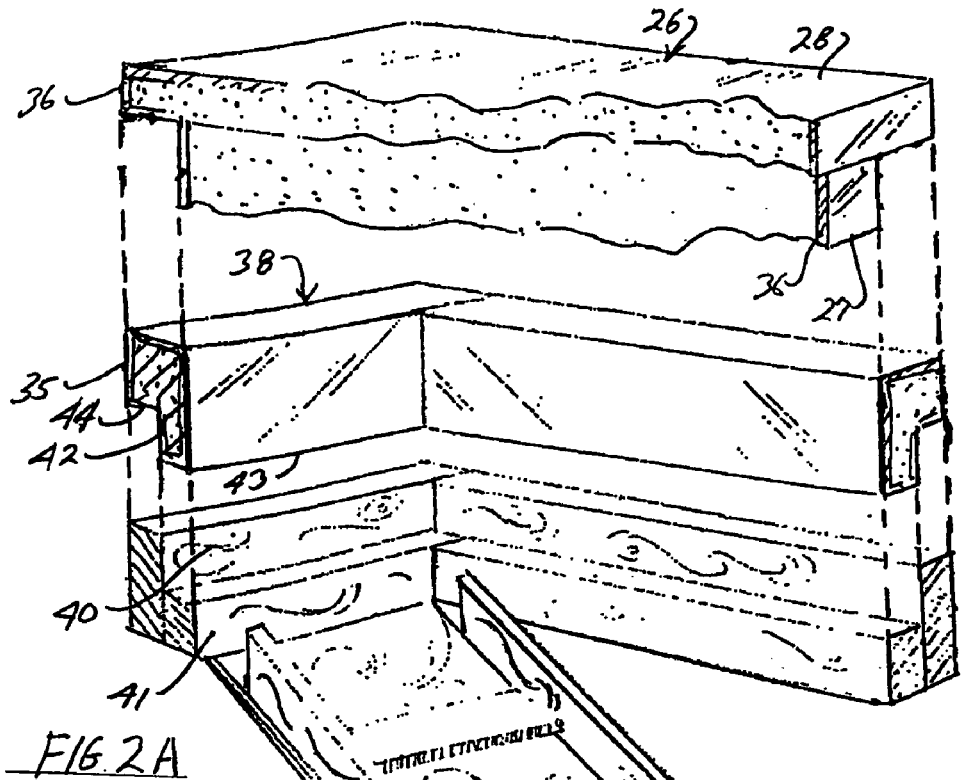
FIG. 2A
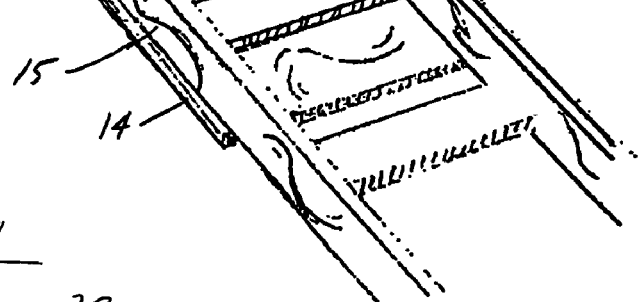
FIG. 4

INSULATION COVER FOR ATTIC CLOSURES

BACKGROUND OF THE INVENTION

1. Field of the Invention

This invention relates to covers used to prevent loss of heat during cold weather and loss of cool air during hot weather that is caused by a ceiling trap door and/or pull down attic ladder or stairs in a building.

2. Description of the Prior Art

For all homes with an attic trap door and/or pull down attic ladder, there is typically only a thin plywood closure used to provide insulation for the area of the trap door or pull down ladder (opening). This opening creates a gap in the insulation of the building. The plywood door typically has an insulating R-Factor of 0.5 or less, while the rest of the attic has insulation of R-19 or greater. There have been a number of inventions to date that have addressed this problem with two main approaches.

There are a number of one-piece covers. U.S. Pat. No. 4,299,059 discloses a ceiling door that is insulated and to which an attic ladder is attached. U.S. Pat. No. 4,151,894 discloses a one-piece cover for an attic opening that fits over the attic door. It is double walled and able to contain a layer of insulation. U.S. Pat. No. 4,281,743 similarly provides a one-piece cover for an attic opening that fits over the attic door. This cover, however, is a shell, comprised of multiple pieces that need to be assembled in a tongue and groove design into which insulating panels are inserted. U.S. Pat. No. 5,475,955 discloses a two-piece shell that is able to contain insulation. U.S. Pat. No. 4,832,153 is also a one-piece cover for an attic opening. This cover consists of detachable components that can be stored or attached with assembly components to serve as an insulating cover. U.S. Pat. No. 4,928,441 discloses an inverted tub shaped cover that is hinged to an attic floor. U.S. Pat. No. 5,271,198 discloses a compartmentalized plastic or fiberboard shell with a moisture barrier insert that can accommodate insulation. U.S. Pat. No. 5,628,151 discloses a one-piece shell with multiple pockets that can hold insulation.

There have also been other two-piece covers. U.S. Pat. No. 4,344,505 discloses a stationary frame with a hinged door that opens to an upright position. The door and frame are made of insulated material and covered with wood furring for securing the hinges to the door and frame. The door merely rests on the frame. U.S. Pat. No. 4,591,022 discloses a frame and door, but the door is in three pieces. In order to open the door, it collapses in an accordion manner to gain access to the attic. The frame consists of components that are attached and secured to the attic floor with hinges.

U.S. Pat. No. 4,312,423 discloses an all in one approach for a ladder, insulating cap and packaging container.

With each patent, there are some consistent elements. Each patent referenced above is not in itself an insulating solution. Rather, it is a shell made of various materials into which one can insert insulation. Thereafter, each solution has distinguishing ways to affix the cover to the attic and open the cover to access the attic. The shells require some assembly.

SUMMARY OF THE INVENTION

It is a principal object of this invention to provide an insulating enclosure for both trap door and pull down attic door accesses to attics. Each insulation enclosure includes a door or closure member which is elevated as a unit relative to an attic access opening to gain access to the attic and which is sized to seal the access opening when in place. Each door or closure member is primarily constructed of a foam insulation material having a thickness to create an insulation "R" value which is equal to or greater than values set for attic insulations. The material is preferably an expanded polystyrene material which is sealed and coated on its entire exterior surface with a plastic shell or layer, such as an elastomeric resin, which layer is coated with a fire retardant paint or sealant.

A first embodiment of the invention consists of two components. First, a frame that rests in the attic above a trap door or pull-down door, with or without a ladder, and second, a door or closure which rests on and within the frame in such a manner as to create a snug fitting. This combined solution provides a high insulating device that is the same or greater R-Factor as the insulation contained in the attic floor.

Both the door or closure and frame can be moveable so as to provide the maximum flexibility to access the attic and bring in and remove large objects or the frame can also be secured to the attic floor so as to be immoveable. The moveable frame provides an added benefit for attic trap doors and attic ladders that are situated below a low area of the attic.

Both the frame and closure are lightweight so that men, women and youth can readily maneuver the devices.

Both the frame and closure are made principally of insulating material such as expanded polystyrene with a plastic covering or coating to protect them from wear as necessary and which is also coated with a retardant to provide fire resistance.

The closure may have handles on the bottom so that the closure can be grasped, lifted and moved for access to the attic. In preferred embodiments, the handles are mechanically secured to a separate rigid strip of wood or dense plastic with the strip being formed to be secured to the closure members by being interfitted or keyed into assembled relationship therewith.

The frame is of sufficient height so as to accommodate a pull down ladder in its upright and folded position in the attic. The frame has a length and a width that either exceeds the opening in the attic floor that is made for a trap door or pull down ladder or is the same size.

The frame may have handles on the sides so that the frame also can be grasped, lifted and moved for access to the attic. The handles are preferably attached as described above with respect to the closure member.

The bottom of the closure and top of the frame are cut in one of a plurality of ways to create a close fitting. A first way is such as to create an inlaid fitting. In this way, the bottom of the closure is parallel to the perimeter of the rest of the closure, but slightly narrower than its framing, thus creating a lip. The top of the frame is made so that there is a matching opening inside the perimeter of the frame in such dimension so that it can receive the closure and form one rectangular piece.

A second fitting is achieved by a beveled cut on both the bottom, outside edges of the closure and the top inside edges of the frame. The closure is beveled inwardly from the top and becomes narrower thereafter. The frame is cut in the same way so as to accept the beveled cut of the closure and thereby fit and form one rectangular piece.

The bottom of the frame is also in two different designs. Particularly for those attics that have support trusses on the edge of or very close to the opening in the attic that is narrower than the opening in the floor. The outer edge of the frame is no wider or longer than the opening for the trap door or pull down ladder. This creates a lip in the bottom of the frame that rests on the opening in the attic floor for the trap door or pull down ladder. This allows the frame to fit into the opening for the trap door or pull down ladder without interfering with the attic support trusses.

The second design for the bottom of the frame is for attics with some amount of flooring around the trap door or pull down ladder. In this case, the frame is slightly wider and longer than the opening for the trap door or pull down ladder and it rests on the attic flooring.

A second embodiment of the invention is for use in structures where no attic stairs are used with the attic trap door. In many of these instances, a wooden frame is provided including a peripheral lip on which the trap door is seated. In this embodiment, only the closure member is used. The closure member includes a body portion of a size to snugly fit within the frame defining the access opening to the attic. A peripheral ledge or flange extends outwardly from the top of the body so as to support the body from the upper edges of the structural frame. The closure member is constructed of the same material and is sealed and fireproofed as previously described.

With the second embodiment, in some housing structures, a one-piece closure member can not be inserted through the access opening. Therefore, the closure members may be formed of two components which are designed to interfit with one another after being inserted through the access opening and are retained in assembled relationship, such as by gluing.

BRIEF DESCRIPTION OF THE DRAWINGS

FIG. 2A is an exploded perspective view in partial cross section of a modification of the embodiment of FIG. 1;

FIG. 4 is a perspective bottom view of the closure member of FIG. 3 showing handles applied to the closure;

DESCRIPTION OF THE PREFERRED EMBODIMENT

Although the present invention will be described hereinafter with particular reference to the accompanying drawings, it is to be understood at the outset that it is contemplated that the present invention may be varied in specific detail from that illustrated and described herein while still achieving the desirable characteristics and features of the present invention. Accordingly, the description that follows is intended to be understood as a broad enabling disclosure directed to persons skilled in the applicable arts, and is not to be understood as being restrictive.

Figure 1:
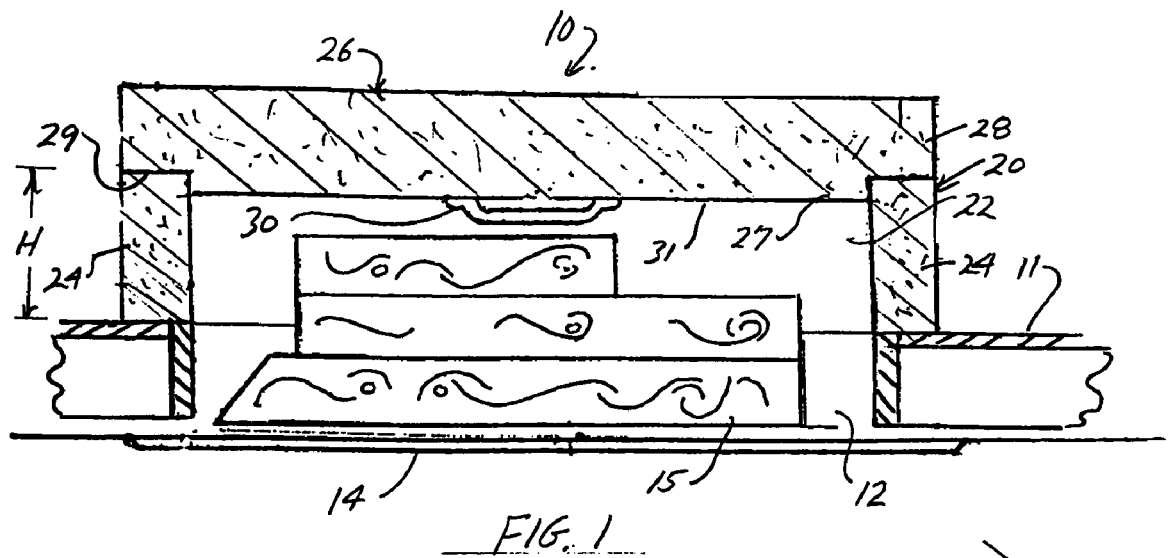
FIG. 1 is a cross sectional illustrated view of a first embodiment of the invention showing the insulating cover mounted above a conventional attic pull down ladder.

With specific reference to FIGS. 1-6 a first embodiment of the present invention is disclosed. In FIG. 1 an insulated cover 10 for an attic closure is shown as being mounted so as to rest on an attic floor 11 in surrounding relationship with respect to an access opening 12 into an attic. As shown, the attic is normally closed by a trap door 14 which may, in some instances, be formed as a part of a fold down ladder or stairs 15. In some instances, no ladder is provided in which case the trap door is mounted within a frame which is provided in the ceiling around the access opening such that the trap door may be inserted upwardly through the access opening and then rest on the frame thereby closing the access opening to the attic.

As previously discussed, conventional trap door and trap door fold down ladder or stairs combinations are areas in which thermal losses occur in most building structures as the thermal insulating properties of the trap door is not nearly that of the insulation which is used in the attic space.

The insulated cover 10 includes an open frame 20 having elongated generally parallel side walls 22 and generally parallel spaced end walls 24. In the embodiment shown, the frame is generally rectangular or square in configuration and the height "H" of the walls of the frame is sufficient that the upper edge of the frame extends above any ladder or stairs that may be positioned within the access opening. The frame is preferably of a size to extend along the edge of the access opening as shown in FIG. 1 so as not to interfere with the access opening.

The frame 20 is designed such that it may simply rest on the floor of the attic space, however, in some instances, the frame may be secured to the floor.

The insulation cover 10 also includes a removable closure member 26 which is preferably formed of the same insulating material as the frame 20. In the embodiment of FIG. 1, the closure member includes a central body portion 27 which depends below or extends outwardly relative to an upper portion 28 such that the upper portion defines a peripheral ledge 29 for the closure member. The central body portion is specifically designed to be of a size to snugly and frictionally engage within a central area 25 defined by the frame 20, as shown in FIG. 1, such that the ledge extends outwardly into general alignment with the outer edges of the frame. This snug interfitting relationship between the closure member and the frame forms a generally "L-shaped" seal which prevents air from passing between the closure and the frame when positioned as shown in FIG. 1, thereby providing maximum thermal efficiency when in use.

Figure 3:
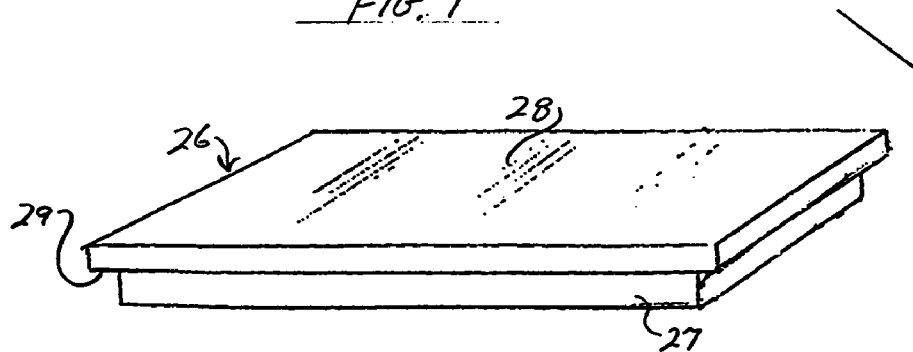
FIG. 3 is an assembly view of the modified embodiment of FIG. 2A showing handles applied to the frame.
Figure 3:
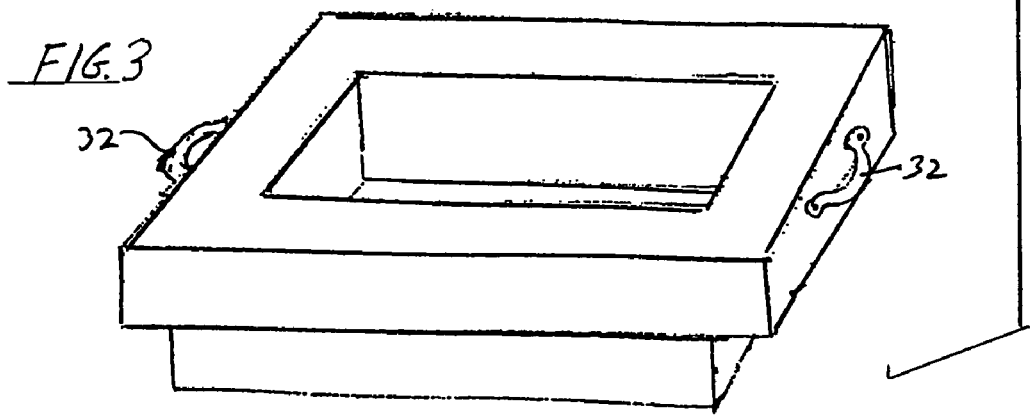

Because of the manner in which the closure member snugly engages within the frame 20, in preferred embodiments, one or more handles 30 are provided which extend from the lower surface 31 of the main body of the closure member. In this manner, the handles may be engaged to force the closure member into snugly fitted relationship with the frame when in use. Also, as shown in FIG. 3, to facilitate maneuvering of the frame, handles 32 may be secured to one or more side walls thereof, as is shown in the drawing figures.

Both the frame and the closure member are preferably made of lightweight dense insulating board such as an expanded polystyrene material with R-Factor sufficient, when used in conjunction with one another, to prevent lost of cool air from a structure when the ambient weather is warm and to prevent the loss of warm air from the structure when the ambient weather is cool. Further, to provide for safety, ease of assembly and durability, the frame is sealed by a plastic shell or layer which is coated with a fireproof material, as shown at 35 in FIG. 2A. In a like manner, the closure member is also sealed and coated with the same plastic shell and fireproof material, as shown at 36. The fire retardant coated layers are preferably an elastomeric resin. The fireproof or retardant coating may be paints or sealants which meet fire hazard classifications ASTM E-84 (NFPA 255) Class A. One such product is Sherman Williams™ Flame Control No. 20-20, an intumscent material.

Figure 2B:
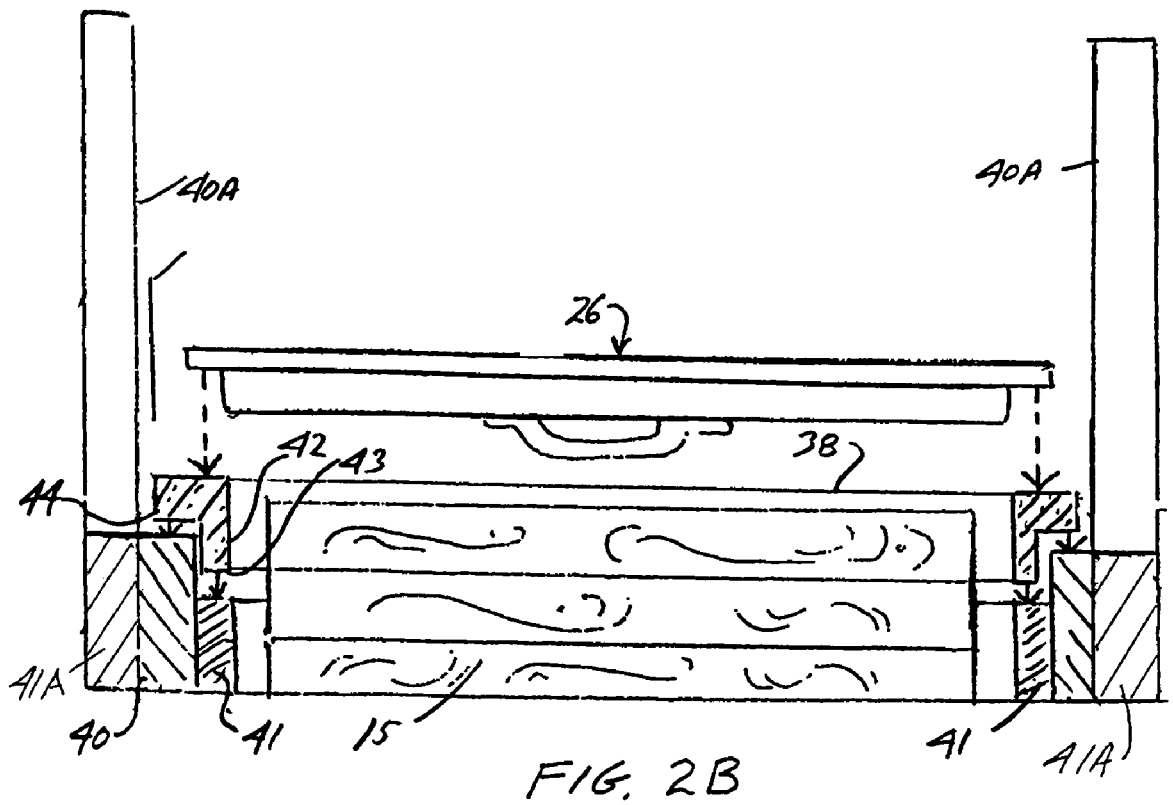
FIG. 2B is a cross sectional assembly view of the modification of FIG. 2A showing attic support trusses and with the pull down ladder raised.

FIGS. 2A-4 show a variation of the embodiment of the invention shown in FIG. 1. In this variation, the closure member 26 is the same as that described with respect to the previous variation. However, in this variation, the frame 38 is designed to be partially seated within a frame 40 defining the access opening into the attic. In some fold down ladder structures, the ladder is attached to a secondary frame 41 mounted within the primary access opening, as shown in FIGS. 2A and 2B. Further, the wooden frame 40 may be suspended from vertical support trusses 40A secured to adjacent floor joists 41A. In these instances the frame must fit to the framed opening without interference with the trusses. Thus, the frame of the invention may be formed with an inner depending flange 42 which is of a size to frictionally seat within the frame 40 defining the access open such that the lower surfaces 43 thereof abuts the secondary frame 41 of the pull down ladder. With this structure, the upper and outer portion of the frame also forms a generally horizontal lip 44 which extends along the periphery thereof which seats and seals against the upper portion of the frame 40 defining the access opening inside of the trusses 40A.

In the variation shown in FIGS. 2A-4 the materials and the manner in which the closure member seats with respect to the frame is the same as that previously described.

Figure 5:
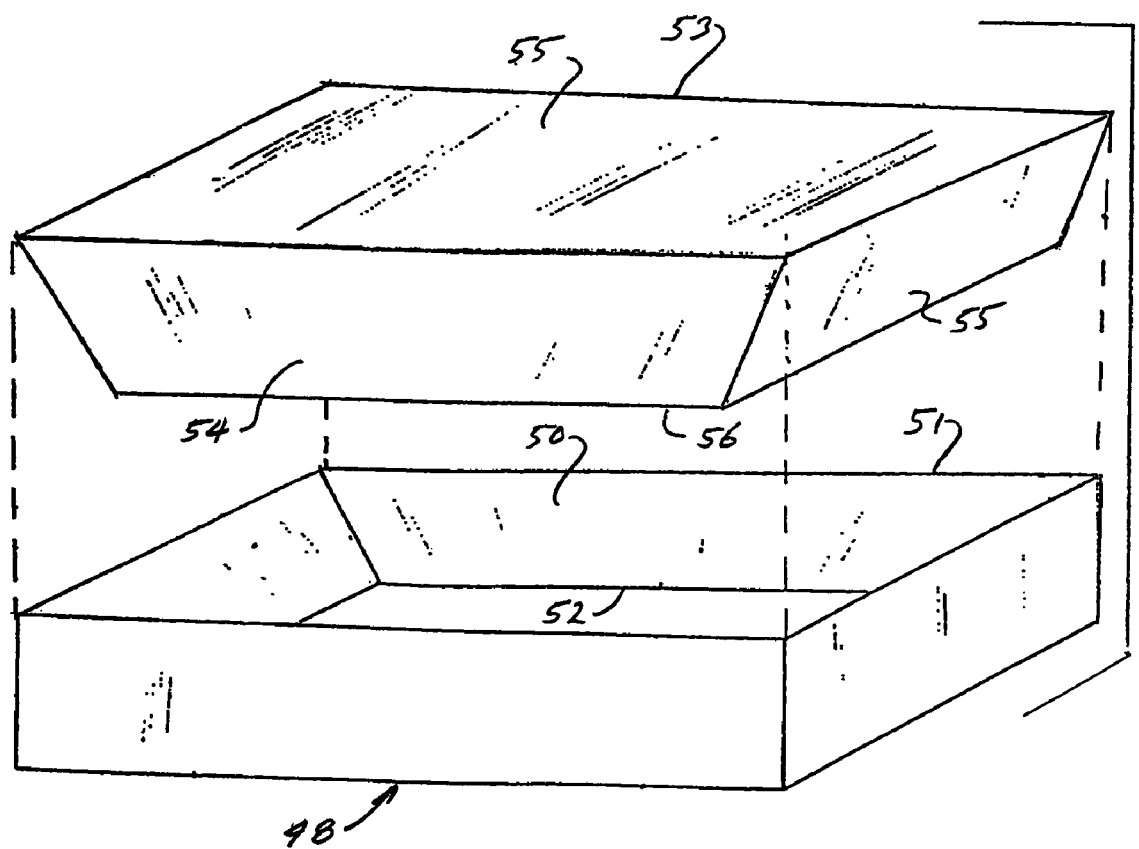
FIG. 5 is a front perspective assembly view of another variation of the first embodiment of the invention.

With respect to FIG. 5, a further variation of the first embodiment of the invention is shown. In this variation, as opposed to having the closure member and frame configured to form a generally L-shape seal area between the components of the insulation cover, the frame 48 is formed having internally beveled surfaces 50 which extend inwardly from upper edges 51 toward lower edges 52 thereof such that the inner side walls taper inwardly from the top to the bottom of the frame. A closure member 53 includes opposite side walls 54 and opposite end walls 55 each of which is beveled inwardly from the top 55 toward the bottom 56 of the closure member. The configurations of the beveled surfaces are designed such that the closure member 53 seats and seals with the side walls thereof against the tapered side walls of the frame. The material used in this embodiment is the same as that as previously described. Although, not shown in FIG. 5, appropriate handles may also be provided on the frame and on the closure member to facilitate maneuvering of each component when necessary.

Figure 6:
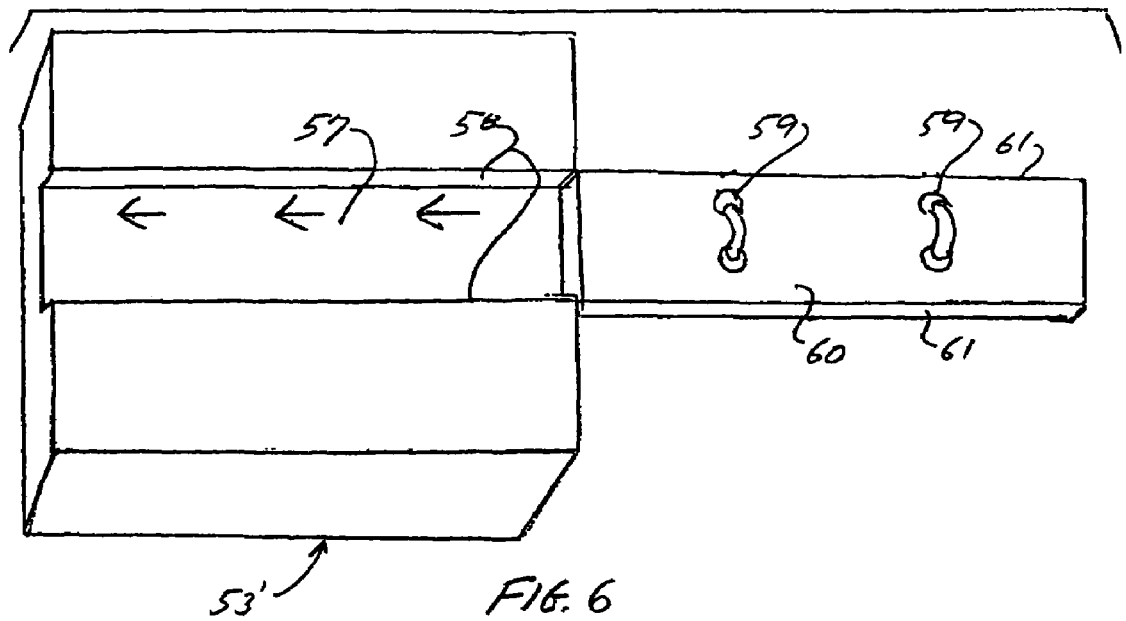
FIG. 6 is a perspective assembly view of a preferred manner of securing handles to the closure members and frames of the invention shown with the closure member of FIG. 5 but being the same for all embodiments of the invention.

In this respect and with specific reference to FIG. 6, a preferred manner of securing handles to the various embodiments of the invention is shown. A closure member 53' similar to that shown in FIG. 5, is shown as including a groove or channel 57 formed therein defined by undercut or beveled opposing edges 58. The channel is formed during molding. Handles 59 are secured by mechanical fasteners to a slide strip 60 of wood or dense plastic which is mechanically able to retain the fasteners without fracturing. The side edges 61 of the strip are beveled to interlock within the channel by sliding the strip as shown by the arrows in the drawing figure. Glue or other adhesive is used to secure the strip to the closure member. Securing the handles in this manner is important as the material from which the closure members and frames of the invention are constructed, is not suitable to securely mount handles without material failure.

Figure 7:
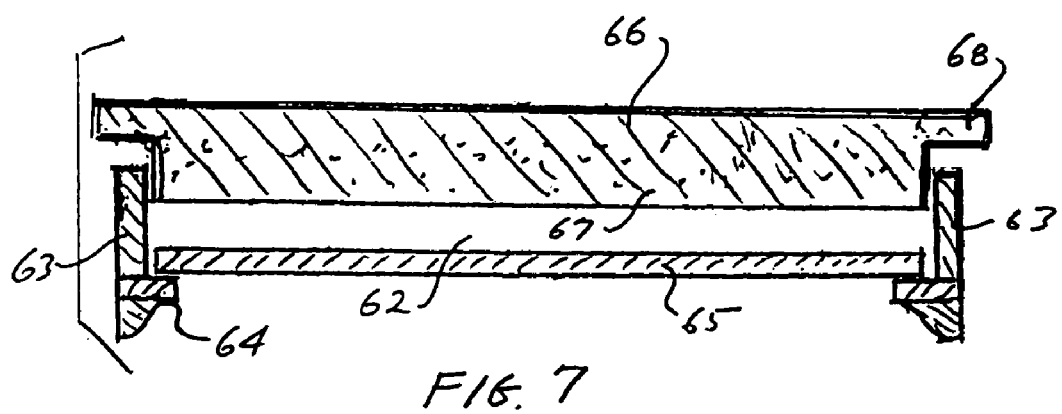
FIG. 7 is a cross-sectional view of a second embodiment of the invention wherein the closure member is used without a separate insulation support frame.

With reference to FIG. 7, another embodiment of the invention is disclosed. This embodiment is particularly suited for use with attic access openings which do not have folding ladders or stairs and wherein the access openings 62 are defined by structural wooden frames 63 to which finishing strips 64 are attached to define a peripheral ledge for supporting an attic trap door 65. In this embodiment, only the closure member 66 is used and no insulation frame is used, as is the case in the previous embodiment.

As shown, the closure member 66 is constructed in the same manner as the closure member described with respect to FIGS. 1-4 having a body portion 67 of a size to fit snugly within the structural frame 63. A peripheral flange 68 extends from the body and is designed to provide a seal against the upper surface of the structural frame 63. Although not shown, handles may be provided, especially as described with respect to the closure member of FIG. 6. The closure member is constructed of the same insulating material described with respect to the previous embodiment and is sealed and coated with a fireproof coating as previously described.

In some instances, attic access openings are relative small or positioned close to a roof line thereby limiting the ability to insert single piece closure members into position. The present embodiment includes variations wherein the closure member is formed of two interfitting components which may be adhesively secured to one another after being inserted into an attic space above an attic trap door access opening.

Figure 8:
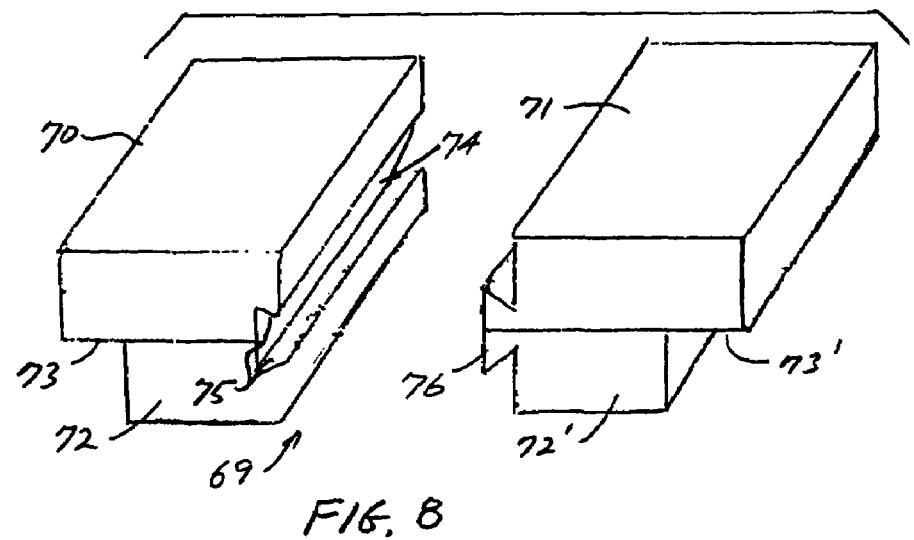
FIG. 8 is a perspective assembly view showing a variation of the second embodiment wherein the closure member is formed from two components by keying or interlocking the components relative to one another.

As shown in FIG. 8, a closure member 69 includes two components 70 and 71, each having a body portion segment 72, 72', respectively, and upper flange segment 73, 73', respectively. Component 70 includes a channel 74 having opposing beveled side walls 75 in which an elongated tongue or flange 76 of the opposing component is slidingly received. The shapes of the channel and tongue are such that the two components may be interlocked by sliding relative to one another to thereby form a single closure member. Adhesive or glue is applied in the joint prior to fitting or the interfitting edges may be coated with adhesive strips which are applied during manufacturer and covered with appropriate removable tape such that the user need not apply separate glue or adhesive during assembly.

The general configuration and the materials from which the assembled closure member is formed are the same as that discussed with respect to the previous embodiment. In the drawing figures, only a portion of one side of each closure member is shown for purposes of showing the interlocking relationship therebetween.

Figure 9:
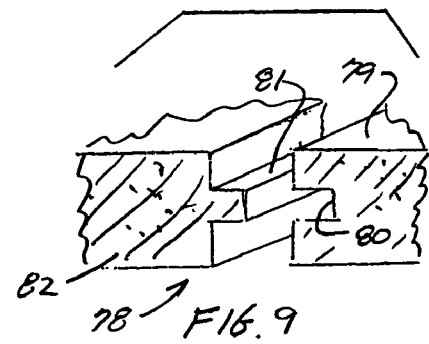
FIG. 9 is a partial cross-sectional view of an alternate variation of the second embodiment showing a different interlocking relationship between the components of the closure member.

In FIG. 9 a variation is disclosed in which the closure member 78 includes a first component 79 having a generally u-shaped channel 80 in which a protruding tongue 81 of an opposing component 82 may be received. The components may be secured as previously described to thereby form a single closure member.

Figure 10:
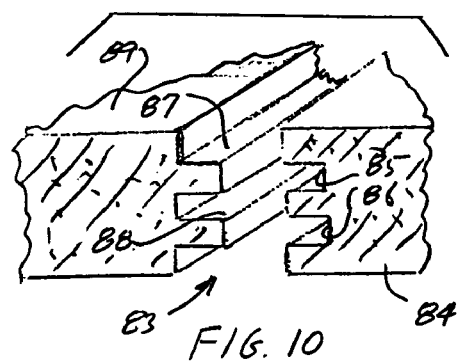
FIG. 10 is a view similar to FIG. 9 showing a further variation of an interlocking joint between the components of the closure member.

In FIG. 10, the closure member 83 includes a first component 84 having a pair of slots 85 and 86 which are generally u-shaped in section which receive protruding tongues or flanges 87 and 88 which extend from an opposing edge of frame component 89. Again, the components are adhesively secured as previously described.

Figure 11:
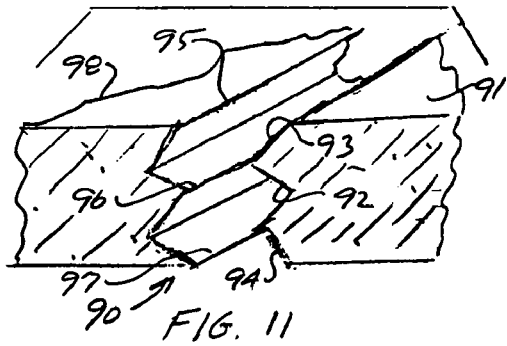
FIG. 11 is a view similar to FIG. 9 showing a further variation of an interlocking joint between the components of the closure member.

In FIG. 11, another type of sealing relationship is disclosed between opposing edges of two components of a closure member 90. In this variation, the closure member includes a first component 91 including a central v-shaped channel 92 defined by opposing beveled edges and outer beveled edges 93 and 94. The beveled edges cooperate with elongated tapered flanges 95, 96 and 97 defined along the opposing edge of component 98 such that when the members are seated with respect to one another, a very tight seal is created therebetween.

Figure 12:
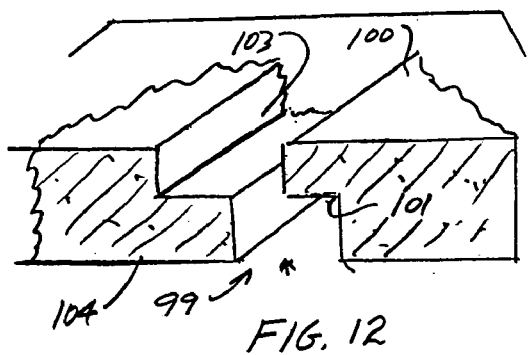
FIG. 12 is a view similar to FIG. 9 of a further variation of interlocking joint between the components of the closure member.

With specific reference to FIG. 12 a further variation of the present embodiment is disclosed. In this embodiment, the closure member 99 includes a first component 100 having an L-shaped cut-out or recess formed along each of the side and end walls, as shown at 101, which is of a size to cooperatively engage an L-shaped cut-out 103 formed in the opposing edge portion of component 104. The components are adhesively joined after being inserted into an attic space as previously described.

The present invention is designed to be lightweight and yet formed of insulating material that will provide for maximum insulating value when the cover is placed into use. Because of the interfitting relationship of the closure member with the inner surfaces of the support frame or with a structural frame, a very tight seal is provided which further ensures maximum insulating efficiency.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. An insulating cover assembly in combination with an existing attic access, the combination comprising:

an existing attic access having a surrounding structure integral to a ceiling of a building and providing access to said building's attic, said existing attic access defining an existing attic access opening therethrough and having an existing trap door for closing said existing attic access opening;

an insulating cover placed on said surrounding structure and including:

a continuous frame having spaced side walls and spaced end walls and which frame is formed of a free standing insulating material having an upper surface and a lower surface, said frame defining a frame opening therethrough, said frame opening being aligned with said existing attic access opening, said frame being of a size and configuration so as to enclose said existing attic access opening when said lower surface is supported on said surrounding structure; and a removable closure member formed of a free standing insulating material, said removable closure member not being bonded to any portion of said continuous frame and said removable closure member including:

a depending central portion, said depending central portion being sized and shaped to fit within said frame opening defined by said frame and fictionally and snugly engage each of said side walls and said end walls of said frame inside said frame opening to create a first continuous seal with said frame when said removable closure member is positioned on said frame in a covering relationship with respect to said frame opening; and an upper portion forming flanges, said flanges extending laterally outward relative to said depending central portion, said flanges being sized and shaped to frictionally and snugly engage an upper surface of each of said side walls and end walls of said frame to create a second continuous seal with said frame when said removable closure member is positioned on said frame in covering relationship with respect to said opening defined by said frame;

wherein said closure member is not hinged to and detaches from said frame when said first continuous seal and said second continuous seal are broken by a force applied to said removable closure member through said frame opening, leaving said frame enclosing said existing attic access opening; and wherein said first seal and said second seal are generally orthogonal to each other when said removable closure member is positioned on said frame in covering relationship with respect to said opening defined by said frame.

2. The combination of claim 1 including at least one handle extending from a lower surface of said removable closure member so as to be accessible within said frame opening when said removable closure member is positioned on said frame in covering relationship with respect to said frame opening.

3. The combination of claim 1 in which said removable closure member includes at least first and second components each having opposing edges which are configured to cooperatively engage one another to create a seal therebetween, and means for adhesively securing said opposing edges so as to form a unified removable closure member.

4. The combination of claim 1 in which said insulating material of said removable closure member and said frame is an expanded polymeric material.

5. The combination of claim 1 wherein said trap door comprises a hatch.

6. The combination of claim 1 wherein said trap door is attached to a fold down attic access ladder.

7. The combination of claim 1 wherein said removable closure member comprises two pieces, the two pieces having a seal between them when positioned on said frame in covering relationship with respect to said frame opening.

8. The combination of claim 7 wherein said two pieces are adhered together.

9. An insulating cover assembly in combination with an existing attic access, the combination comprising:

an existing attic access defining an existing attic access opening therethrough and having an existing trap door for closing said opening;

a continuous frame having spaced side walls and spaced end walls and which frame is formed of a free standing insulating material, said frame defining a frame opening therethrough for alignment with said existing attic access opening, said frame being of a size and configuration so as to surround said existing attic access opening, said frame also including a generally continuous depending portion extending downward from each of said side and end walls, said generally continuous depending portions being configured so as to extend into said existing attic access opening and to frictionally seal to said existing attic access opening; and a removable closure member formed of a free standing insulating material, said removable closure member not being bonded to any portion of said continuous frame, and said removable closure member including:

a depending central portion, said depending central portion being sized and shaped to fit within said opening defined by said frame and frictionally and snugly engage said side walls and end walls of said frame inside said opening to create a first continuous seal with said frame when said removable closure member is positioned on said frame in covering relationship with respect to said opening defined by said frame; and an upper portion forming flanges, said flanges extending laterally outward relative to said depending central portion, said flanges being sized and shaped to frictionally and snugly engage an upper surface of said frame to create a second continuous seal with said frame when said removable closure member is positioned on said frame in covering relationship with respect to said opening defined by said frame;

wherein said closure member is not hinged to and detaches from said frame when said first continuous seal and said second continuous seal are broken by a force applied to said removable closure member through said frame opening; and wherein said first seal and said second seal are generally orthogonal to each other when said removable closure member is positioned on said frame in covering relationship with respect to said opening defined by said frame.

10. The combination of claim 9 including at least one handle mounted to extend from a lower surface of said depending central portion of said removable closure member so as to be accessible within said frame opening when said removable closure member is positioned on said frame in covering relationship with respect to said frame opening.

11. The combination of claim 1 wherein said removable closure member and said frame are coated with a fire retardant material.

* * * * *